United States Patent [19]
Campbell et al.

[11] Patent Number: 5,274,212
[45] Date of Patent: Dec. 28, 1993

[54] LASER PROCESSING APPARATUS

[75] Inventors: Mark A. Campbell, Canton; John J. Sniezek, Dearborn Heights, both of Mich.

[73] Assignee: General Motors Corporation, Detroit, Mich.

[21] Appl. No.: 955,202

[22] Filed: Oct. 1, 1992

[51] Int. Cl.⁵ .............................................. B23K 26/12
[52] U.S. Cl. ....................... 219/121.86; 219/121.63; 219/121.82; 269/32; 269/224
[58] Field of Search ....................... 219/121.86, 121.85, 219/121.6, 121.63, 121.64, 121.82, 121.21, 121.22; 269/32, 224

[56] References Cited

U.S. PATENT DOCUMENTS

| | | | |
|---|---|---|---|
| 3,775,586 | 11/1973 | Flint et al. | 219/121.63 |
| 4,965,429 | 10/1990 | Polstorff | 219/121.68 |
| 4,970,367 | 11/1990 | Miller | 219/121.68 |
| 5,039,836 | 8/1991 | Lemelson | 219/121.13 |

OTHER PUBLICATIONS

Illustrations of a Door Seal Mechanism—pp. 1-3.
Illustrations of a Clamp Assembly.

*Primary Examiner*—C. L. Albritton
*Attorney, Agent, or Firm*—Anthony L. Simon

[57] ABSTRACT

A door seal apparatus for a laser operating station, comprises a fixed wall with an opening, a turn table device with a turn table wall positioned within the opening, the turn table device having at least two positions in which the turn table wall is substantially parallel and coplanar with the fixed wall, with a gap existing between the fixed wall and turn table wall, cylinders for driving a first plate in a first direction over a first portion of the gap, and a cam plate for operationally engaging the first plate to a second plate and for driving the second plate in a second direction over a second portion of the gap as the first plate is driven in a first direction, wherein the first and second plates prevent direct light leaks from the first and second portions of the gap.

6 Claims, 8 Drawing Sheets

LASER PROCESSING APPARATUS

This invention relates to a apparatus for use with a laser processing work station.

BACKGROUND OF THE INVENTION

In a laser beam work station, it is desirable to have a turntable system in which a wall separates an operator from the laser operations. The operator loads a first station of the turntable system while a laser robot operates on the second station of the system. A wall is mounted on the turn table so that laser beams cannot escape from the operating station. Another fixed wall encloses the laser operating station. A gap is provided between the fixed wall and the wall mounted on the turntable to allow the turntable to rotate freely.

Typically, present devices utilize a stationary louver system on the side walls with hinged flaps for the top and bottom turntable wall interfaces to cover the gap between the turn table wall and the fixed wall during laser operations. Such set-ups are labor intensive, include sheet aluminum components that are susceptible to warping during the welding process, and are susceptible to damage if construction is of light gauge. What is desired is an improved way to cover gaps between the turntable wall and the fixed wall during laser weld operations.

During laser welding operations of stamped metal parts, if no filler material is used with the weld, it is desirable to have the parts as close together as possible, with little or no gaps. Often irregularities in part shape and/or burrs on the parts may cause gaps in the desired weld area. What is desired is a way to eliminate such gaps without interfering with or inhibiting the laser weld operation.

Typically, present clamping devices utilize power clamps (ISI, deistic,, etc.) or standard air cylinder drive through a pivot to provide a constant force at the clamp. According to such methods, power clamps only generate rated forces when they lock in position. Interferences due to poor metal fit are sufficient to prevent power clamps from reaching the lock position resulting in extremely low forces. Also, when multiple clamps are driven by a common power source, an interference at one point will receive all of the force and the other clamps will deliver no force resulting in multiple decrepit welds.

When long rows of laser welds are desired, the typical clamping devices require large pivot units to swing the pressure feet into position and then pivot out of the way to allow for part load and unload. According to the typical methods, for parts with long rows of welds, multiple pivot units are required to drive the pressure feet into position. Additionally, the use of multiple pivot units results in tool congestion, swing clearance problems and tool cycle time penalties.

SUMMARY OF THE PRESENT INVENTION

This invention provides an apparatus that seals the turntable wall and fixed wall of a laser system enclosure preventing the possibility of escape of direct laser beams from the enclosure. Advantages of this invention include modular construction of the unit that is easily installed, rugged construction, designed to mount to the interior wall of the safety enclosure protecting components from damage in a hostile production environment.

Advantageously, the door seal apparatus of this invention is readily adaptable to any laser system safety enclosure that requires portions of the exterior walls to move to facilitate mechanical handling transfer of parts or fixtures between tool cycles. Advantageously, this invention utilizes reliable air cylinders to drive a cam plate mechanism and internal cylindicators to provide an interlock features which ensure proper unit function.

Advantageously, this invention provides a durable roller cam system to drive the (aluminum) plate to cover the inter-facial gap between the stationary enclosure walls and the rotating interfacing wall which is mounted on the turntable (rotary dial). The overlap condition across the interfacing gap protects against escape of a primary laser beam reflection.

This invention also provides a clamping device that can be used to ensure the intimate metal fit-up required for laser lap welding. Advantageously, this invention includes a clamp device with a pressure foot having its own pivot and a compliance means arranged in a saddle arrangement to provide individual clamp compliance. Advantageously the clamping device of this invention increases clamp force when an interference due to poor metal fit is encountered by providing individual clamp compliance.

Advantageously the clamping device of this invention allows the clamps to attain lock position when non-compliance of parts would otherwise prevent lock position. By allowing clamping devices to attain lock position, this invention ensures full clamping force, even for non-compliant parts.

Advantageously, individual clamp compliance provided by the invention prevents single interference points from degrading the performance of remaining clamps powered by a common power source.

Advantageously, the compliance means according to this invention can be easily varied, allowing a single saddle design to accommodate various clamping jobs.

Advantageously, this invention provides a means to overcome part fit-up problems with a cost effective clamping unit.

Advantageously, this invention solves shortcomings of congested fixtures and clamping interference by non-compliant parts by providing a rigid bar powered by a linkage/cylinder arrangement at each end to provide constant force along the length of the bar. An individual pressure food can be provided for each weld location along the length of the bar. A compliance means and pressure foot in a saddle arrangement are utilized to provide individual clamp compliance that increases the clamp force when an interference due to poor metal fit is encountered. By providing individual clamp compliance, a single interference point does not degrade the performance of the remaining clamps powered by a common bar clamp unit.

The bar clamp with linkage allows long rows of clamps to be powered by a common bar with a linkage/cylinder arrangement at each end.

Advantageously, this invention is well suited for use with laser machining for accurate manufacturing, easy assembly and quick conversion due to product changes.

Advantageously, multiple pressure foot forces can be designed within the common bar clamp unit by selecting the appropriate compliance means for each saddle clamp.

Advantageously, this invention provides a means to overcome part fit-up problems with a cost effective clamping unit. This invention is extremely beneficial for assemblies which require long rows of welds that are located in the center of relatively large assemblies.

Structurally the door seal apparatus of this invention comprises a fixed wall with an opening, a turn table device with a turn table wall positioned within the opening, the turn table device having at least two positions in which the turn table wall is substantially parallel and coplanar with the fixed wall, with a gap existing between the fixed wall and turn table wall, means for driving a first plate in a first direction over a first portion of the gap, cam means for operationally engaging the first plate to a second plate and for driving the second plate in a second direction over a second portion of the gap as the first plate is driven in a first direction, wherein the first and second plates prevent direct light leaks from the first and second portions of the gap.

Structurally the clamping apparatus of this invention comprises a laser work station, a fixture for retaining at least first and second parts, a clamping device for clamping the first and second parts into the fixture during laser operations, wherein the clamping device comprises (i) a base plate coupled to a pivoting device operatively associated with the base plate to pivot the clamping device between a release position and a lock position, (ii) a saddle plate pivotably mounted to the base plate (iii) a pressure foot fixedly mounted to the saddle, and (iv) compliance means for providing compliance of the clamping device when an irregularity in at least on of the first and second parts would otherwise prevent the clamping device from being pivoted into the lock position.

Structurally the clamping apparatus of this invention comprises a laser work station, a fixture for retaining at least first and second parts, a carrying member, a positioning device operatively associated with the carrying member for pivot the carrying member between a release position and a lock position, at least two clamping devices for clamping the first and second parts into the fixture during laser operations, wherein each clamping device comprises (i) a base plate fixedly mounted to the carrying member, (ii) a saddle plate pivotably mounted to the base plate (iii) a pressure foot fixedly mounted to the saddle plate and (iv) compliance means for providing compliance of each clamping device when an irregularity in at least on of the first and second parts would otherwise prevent the clamping devices from being pivoted into the lock position.

A more detailed description of this invention, along with various embodiments thereof is set forth below.

DETAILED DESCRIPTION OF THE INVENTION

Figure 1:
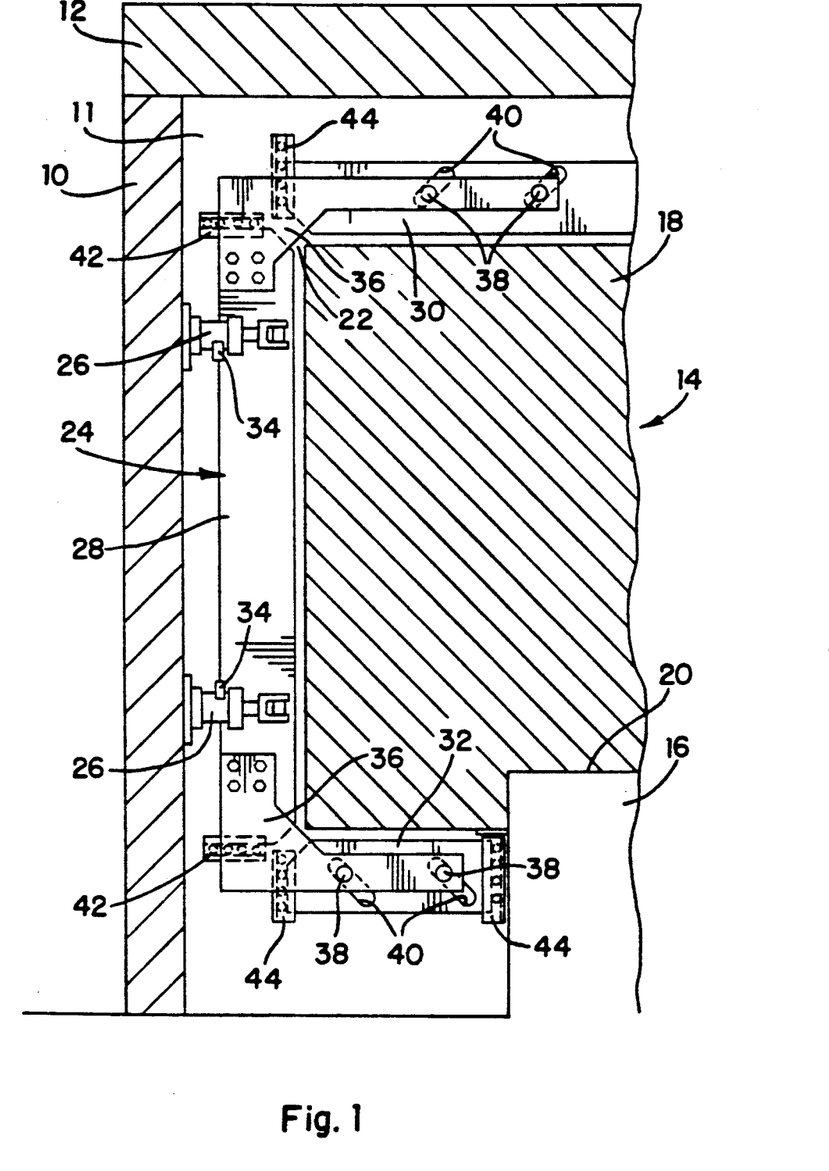
FIGS. 1 and 2 illustrate the door seal apparatus of this invention.

Referring to FIG. 1, the stationary enclosure wall 11 (fixed wall), mounted to side wall 10 and roof 12, is designed to provide clearance to all tooling, such as turn table system 14, as it rotates on the turntable 16 (or similar mechanical handling system). The rotating wall 18 (turn table wall), mounted to the turntable tool plate 20, is designed to match the stationary wall opening 22 providing minimal (0.5") clearance when the two walls are substantially coplanar and parallel.

The cam plate door seal mechanism 24 is mounted, preferably, to the interior stationary wall of the enclosure 47. Following the rotation of the turntable 16, a cam switch (not shown) signals that the turntable is in position. The cam plate cylinders 26 extend, driving the vertical plates 28 (only one shown in FIG. 1) approximately 1.0" in the horizontal (first) direction covering the gap between the stationary enclosure wall and the rotating turntable wall (the movement length can be increase if necessary). The plates 28 are mounted in horizontal linear motion bearings 42, which guide the horizontal motion of plates 28. The seal plates 28, 30 and 32 are offset from the enclosure wall by approximately 0.25" making the seal a non-contact seal. Proximity switches 34 within the cylinders 26 ensure that the seal plates are in position.

The upper and lower horizontal wall gaps are covered by plates 30 and 32 that are driven by the same cylinders 26 through cam plates 36 attached to the vertical wall seal plates 28. The cam plates 36 have cams 38 controlling plates 30 and 32 through operational cam engagement with slots 40 in seal plates 30 and 32 (cam means). Linear motion bearings 44 guide the vertical motion (in the second direction) of plates 30 and 32.

Upon completion of the laser process, the signal is given to open the door seal. Proximity switches 34 within the cylinders 26 ensure that the door seal mechanism 24 is in the clear position allowing turntable rotation, completing the system cycle.

FIG. 1 shows only one portion of the system. It is understood that a rotating turntable implementation of this invention is symmetrical, with the portion shown in FIG. 1 as one of the symmetrical sides.

Figure 2:
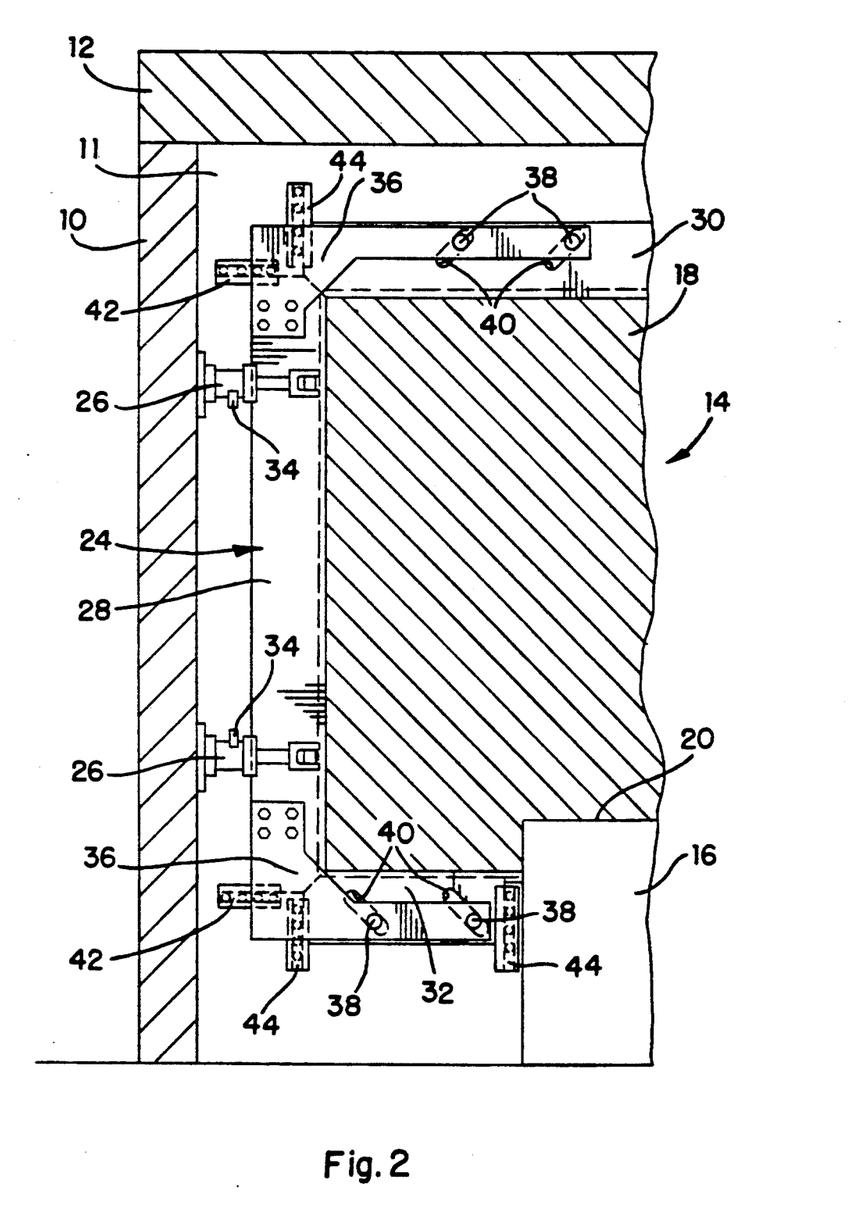

FIG. 2 illustrates the seal mechanism 24 in the sealed position, with seal plates 28, 30 and 32 preventing direct laser light leakage.

Figure 3:
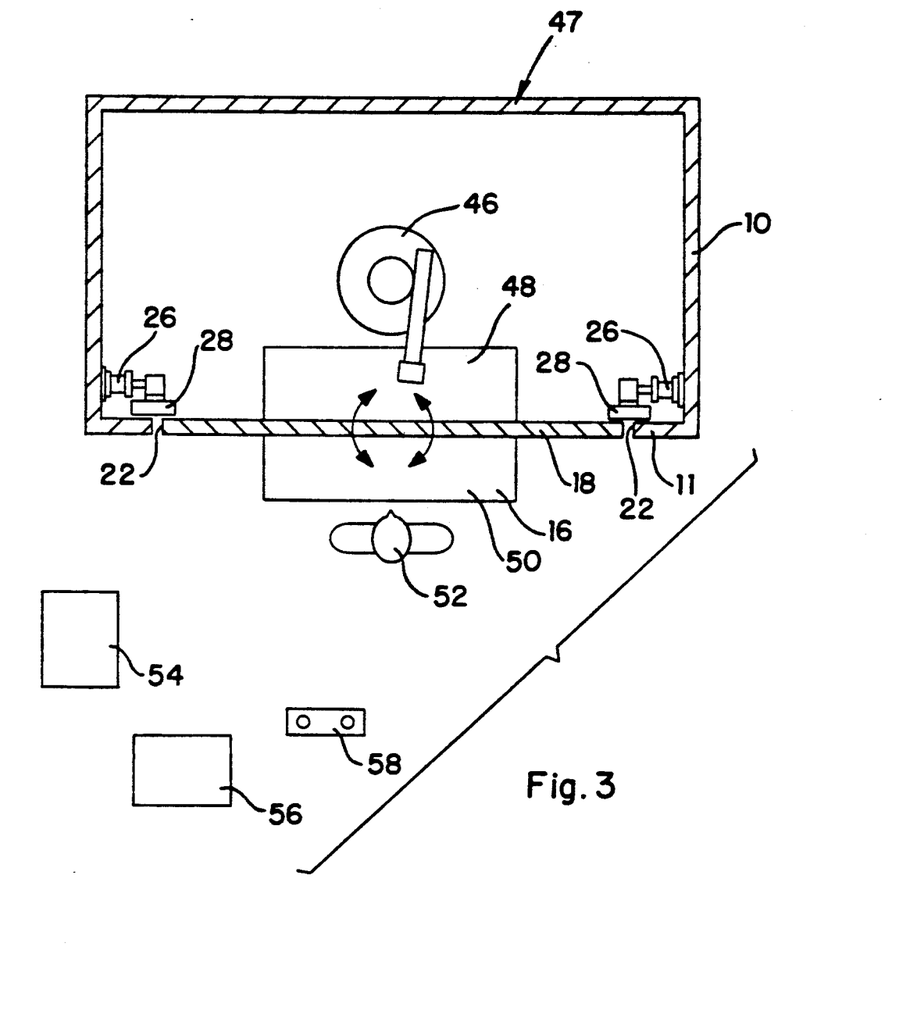
FIG. 3 illustrates a top view (ceiling cut away) or a laser work station incorporating the door seal apparatus of this invention.

FIG. 3 illustrates a top view of a laser station implementing this invention. The plates 28 are shown sealing gaps 22. A laser robot 46 is shown in the interior of enclosure 47 operating on station 48, within the enclosure.

Operator 52 unloads finished parts from station 50, exterior of the enclosure, places finished parts in bin 56, and loads station 50 with unfinished parts from bin 54. When operator 52 is ready to rotate turntable 16 and when laser robot 46 has finished cycling, operator 52 depresses palm station 58, causing rotation of turn table 16 and commencement of a new cycle.

Each station 48, 50 includes fixtures for part location and clamping apparatus for part retention during laser weld operations. The clamping devices may either be located on the turntable or at a fixed station within the enclosure 47 to which the turn table locates the parts. Preferred clamping devices according to this invention are described with reference to FIGS. 4-8.

Figure 4:
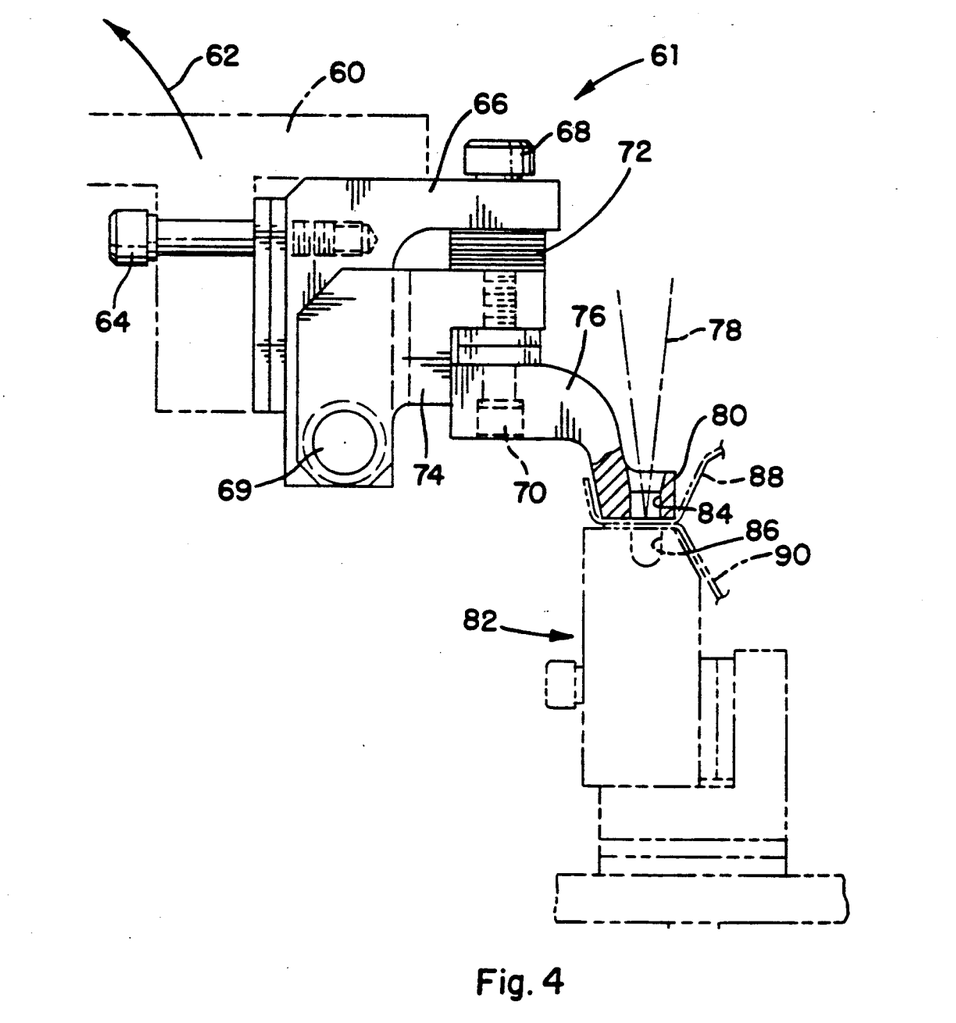
FIGS. 4 and 5 illustrate the saddle clamp according to this invention.

Referring to FIG. 4, the clamp apparatus 61 according to this invention is mounted to T-bar 60 (carrying member) shown. A pivot means, such as a pneumatic cylinder is mechanically coupled to T-bar 60 in a manner well known to those skilled in the art to maintain clamp 61 extended as shown (lock position) or to pivot back clamp 61 in the direction of arrow 62 to release parts 88 and 90 (release position).

Bolt 64 fixedly retains clamp base 66 to T-bar 60. Saddle clamp 74 is pivotably mounted to clamp base 66 as shown by any suitable pivotable mount 69 known to those skilled in the art, such as an oil filled bronze bearing. Bolt 70 engages saddle clamp 74 retaining pressure foot 70 to saddle clamp 74. Bolt 68 engages with saddle clamp 74, limiting the pivot range of saddle clamp 74 in the direction away from clamp base 66.

Compliance means 72, comprising a spring device such as one or more Belleville-type washer washers, applies opposing forces to the saddle clamp 74 and the clamp base 66.

End 80 of pressure foot 76, when the clamp assembly 61 is fully extended, operates together with fixture 82 to retain parts 88 and 90 in place for a welding operation.

An example compliance means 72 is a Belleville spring washer assembly readily available to those skilled in the art. In a preferred implementation using the compliance means, the clamp is designed to compress the spring washer stack 50% under ideal fit-up conditions. In the event of minor surface distortion in part 88 or 90, the spring washers further compress resulting in a greater clamping force. As the spring washers become more fully compressed, they provide even greater force at the individual pressure feet to attempt to overcome the surface distortion. A severe distortion that does not allow the clamp assembly to extend into the stop position is detectable by a proximity switch within the pneumatic cylinder (not shown).

The compliance means can be readily varied by those skilled in the art by varying the spring arrangement to accommodate different metal gauges to be clamped. Adjustment in the compliance means can provide the total adjustment of the system, eliminating adjustment of clamping force by the pneumatic cylinder, since varying the spring arrangement varies the clamping pressure at the ideal 50% compression.

Typical spring washers have relatively small deflection. Stacking the spring washers in series increases the deflection in proportion to the number of washers used without increasing the maximum load. Stacking the washers in parallel increases the maximum load. When the washers are stacked in parallel, a hysteresis in the load-deflection may appear. Lubrication of the spring washer surfaces may decrease the amount of hysteresis and increase the life of the spring washers. The spring washers can be used in combinations of series, parallel, to alter deflection force and distance as the implementation may require. To prevent indentation of metal parts adjacent the spring washers, hardening these components to Rockwell C48 minimum is preferred.

Openings 84 and 86 in pressure foot 76 and in fixture 82 accommodate the laser weld operation. FIG. 4 illustrates the laser beam 78 operating in opening 84 above opening 86.

Figure 5:
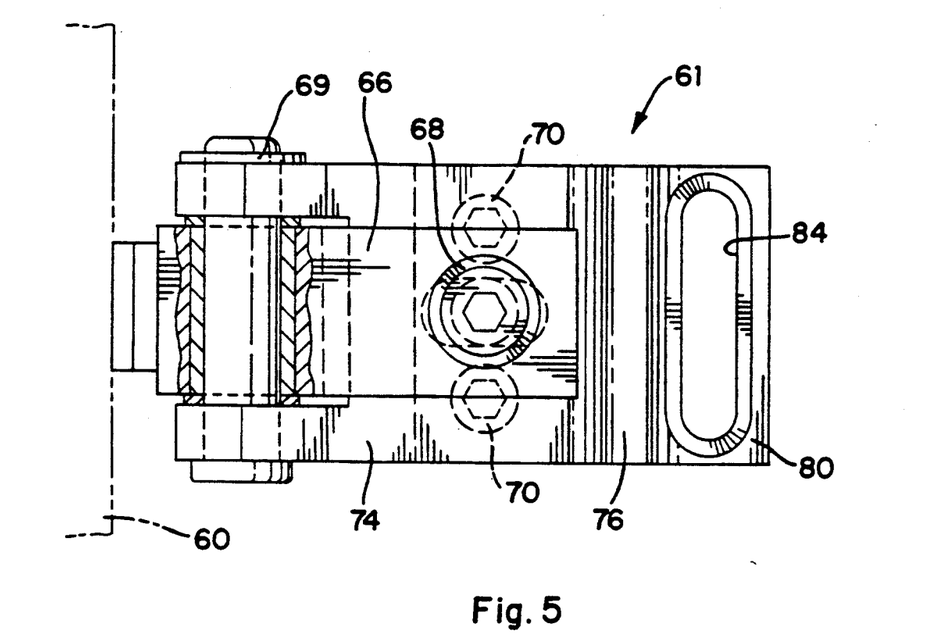

FIG. 5 illustrates a top view of the clamp assembly and illustrates opening 84 where the laser beam operates.

Figure 6:
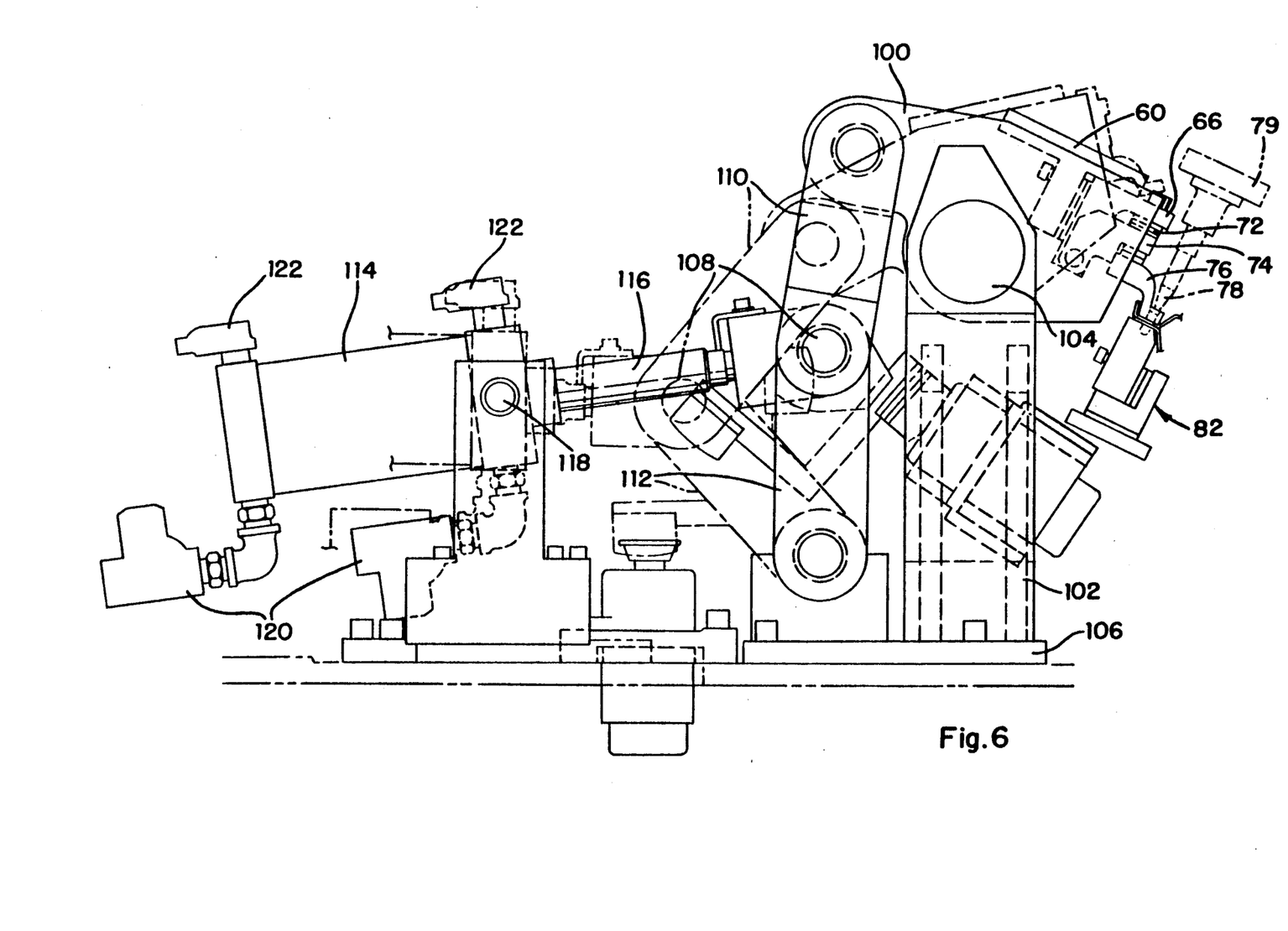
FIGS. 6, 7 and 8 illustrate a saddle clamp linkage implementation of this invention.
Figure 7:
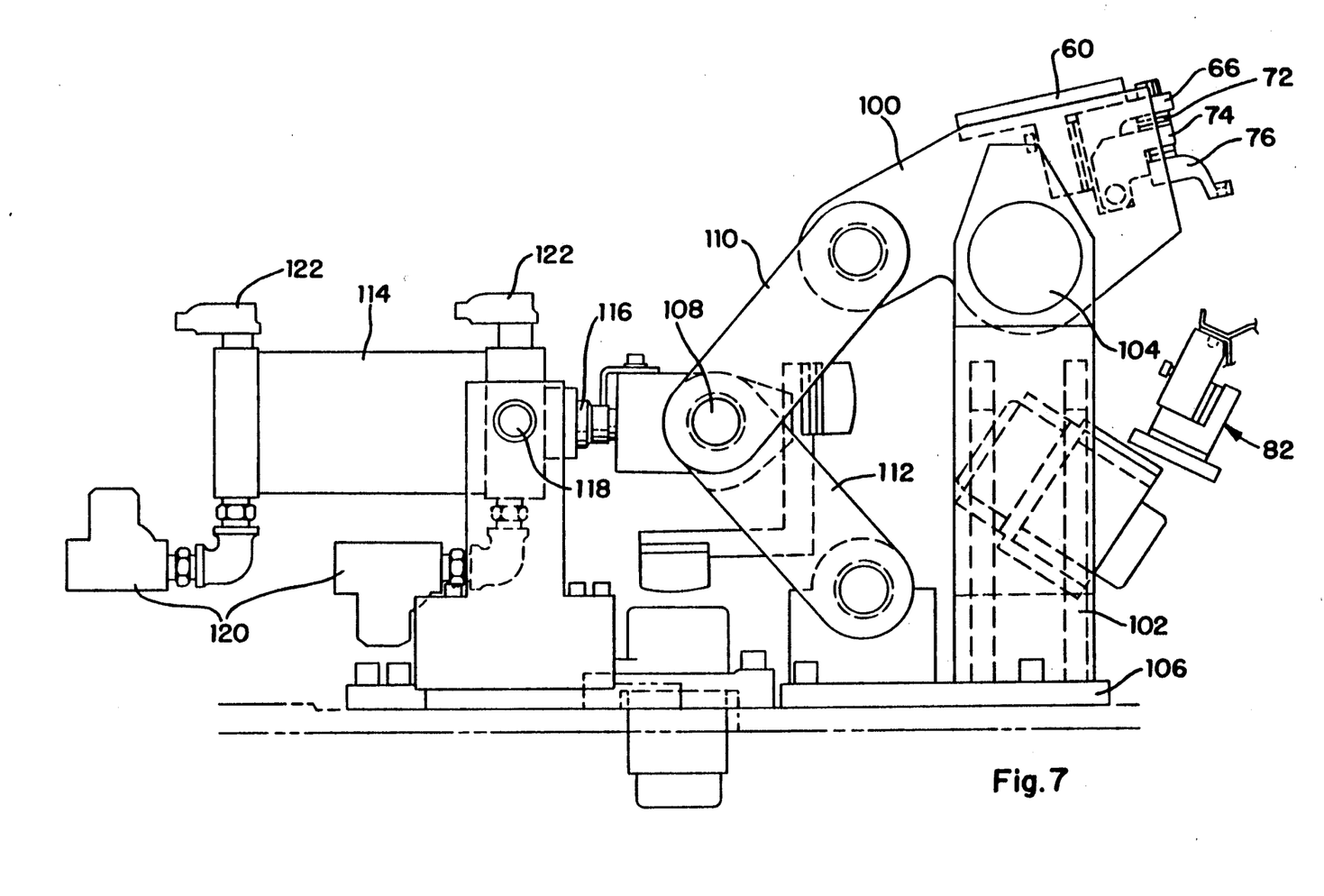
Figure 8:
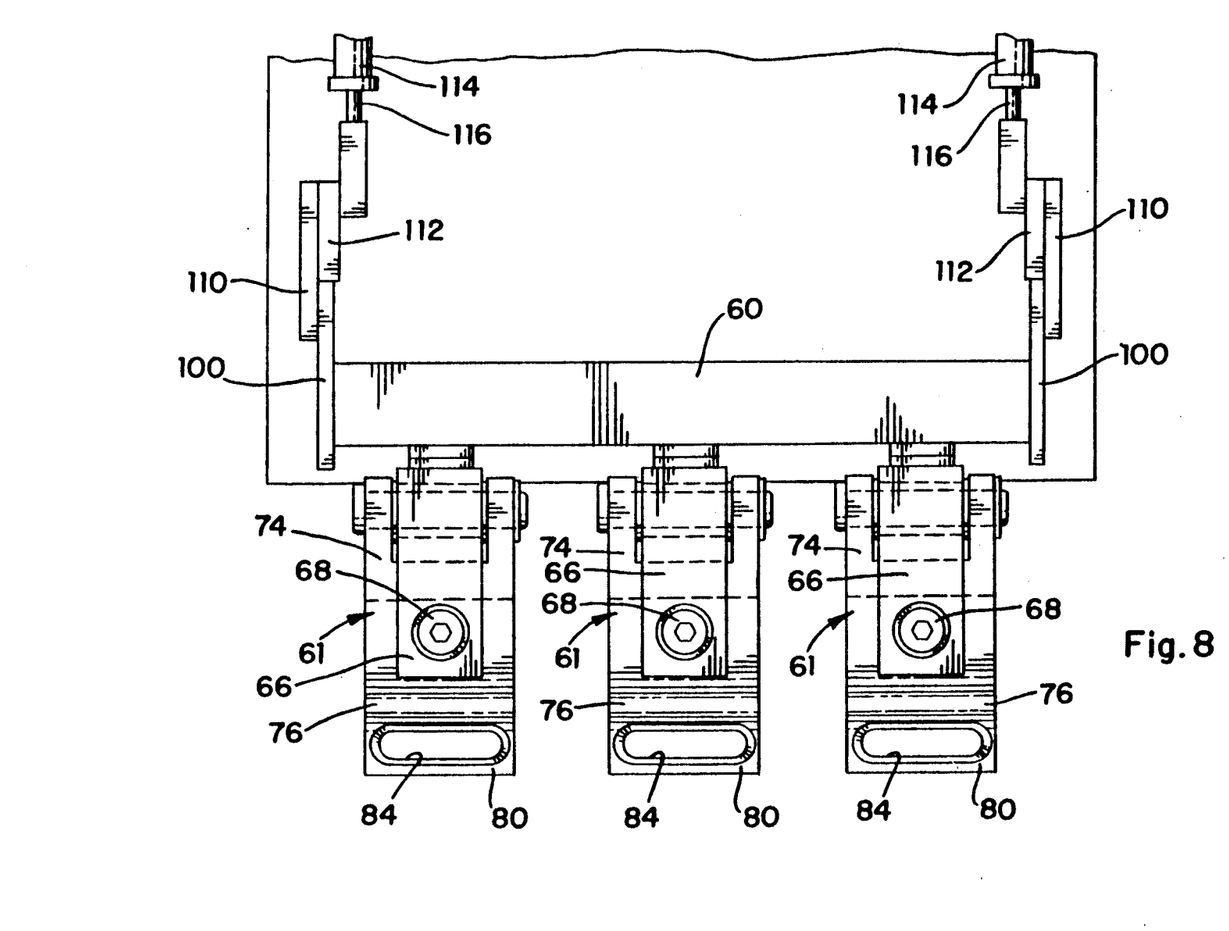

FIGS. 6, 7 and 8 illustrate the clamp linkage of this invention. Pneumatic cylinder 114 extends shaft 116, pivotably mounted to linkage 110, 112 at point 108 to lock linkage 110, 112 in the clamp position. The linkage 110, 112 forces plates 100 forward. Plates 100 are pivotably mounted to vertical supports 102 and the entire assembly is mounted on plates 106. T-bar 60 is mounted between plates 100 and carries, in the example shown, three saddle clamp assemblies according to this invention.

FIG. 7 illustrates the apparatus in the retracted position.

Reference 79 illustrates a laser robot performing a laser weld operation.

The devices of this invention described above are designed to withstand the harsh in-plant environment of constant use requiring much durability.

The above described implementations of this invention are example implementations. Moreover many variations to this invention may occur to those skilled in the art and such variations will fall within the scope of this invention as set forth below.

The embodiments of the invention in which an exclusive property or privilege is claimed are defined as follows:

1. An apparatus comprising:
a fixed wall with an opening;
a turn table device with a turn table wall positioned within the opening, the turn table device having at least two positions in which the turn table wall is substantially parallel and coplanar with the fixed wall, with a gap existing between the fixed wall and turn table wall;
means for driving a first plate in a first direction over a first portion of the gap;
cam means for operationally engaging the first plate to a second plate and for driving the second plate in a second direction over a second portion of the gap as the first plate is driven in a first direction, wherein the first and second plates prevent direct light leaks from the first and second portions of the gap.

2. An apparatus comprising:
a laser work station;
a fixture for retaining at least first and second parts;
a clamping device for clamping the first and second parts into the fixture during laser operations, wherein the clamping device comprises
a base plate coupled to a pivoting device operatively associated with the base plate to pivot the clamping device between a release position and a lock position;
a saddle plate pivotably mounted to the base plate;
a pressure foot fixedly mounted to the saddle plate; and
compliance means for providing compliance of the clamping device when an irregularity in at least one of the first and second parts would otherwise prevent the clamping device from being pivoted into the lock position.

3. An apparatus comprising:
a laser work station;
a fixture for retaining at least first and second parts;
a carrying member;
a positioning device operatively associated with the carrying member for pivoting the carrying member between a release position and a lock position;
at least two clamping devices for clamping the first and second parts into the fixture during laser operations, wherein each clamping device comprises
a base plate fixedly mounted to the carrying member;
a saddle plate pivotably mounted to the base plate;
a pressure foot fixedly mounted to the saddle plate; and
compliance means for providing compliance of each clamping device when an irregularity in at least on of the first and second parts would otherwise prevent the clamping devices from being pivoted into the lock position.

4. An apparatus comprising:

a clamping device for clamping a first part and a second part into a fixture during laser operations, wherein the clamping device comprises a base plate coupled to a pivoting device operatively associated with the base plate to pivot the clamping device between a release position and a lock position;

a saddle plate pivotably mounted to the base plate;

a pressure foot fixedly mounted to the saddle plate; and compliance means for providing compliance of the clamping device when an irregularity in an least one of the first and second parts would otherwise prevent the clamping device from being pivoted into the lock position.

5. An apparatus comprising:

a carrying member;

a positioning device operatively associated with the carrying member for pivot the carrying member between a release position and a lock position;

at least two clamping devices for clamping a first part and a second part into a fixture during laser operations, wherein each clamping device comprises a base plate fixedly mounted to the carrying member;

a saddle plate pivotably mounted to the base plate;

a pressure foot fixedly mounted to the saddle plate; and compliance means for providing compliance of each clamping device when an irregularity in at least one of the first and second parts would otherwise prevent the clamping devices from being pivoted into the lock position.

6. An apparatus comprising:

a fixed wall with an opening;

a door device with a door positioned within the opening, the door device having at least one position in which the door is substantially parallel and coplanar with the fixed wall, with a gap existing between the fixed wall and the door;

means for driving a first plate in a first direction over a first portion of the gap;

cam means for operationally engaging the first plate to a second plate and for driving the second plate in a second direction over a second portion of the gap as the first plate is driven in a first direction, wherein the first and second plates prevent direct light leaks from the first and second portions of the gap.

* * * * *